US006637383B2

(12) United States Patent
Al-Hawaj

(10) Patent No.: US 6,637,383 B2
(45) Date of Patent: Oct. 28, 2003

(54) PIVOTING PISTON ROTARY POWER DEVICE

(76) Inventor: Osama M Al-Hawaj, P.O. Box 15462, Mubark Al Kabeer (KW)

( * ) Notice: Subject to any disclaimer, the term of this patent is extended or adjusted under 35 U.S.C. 154(b) by 0 days.

(21) Appl. No.: 10/102,346

(22) Filed: Mar. 20, 2002

(65) Prior Publication Data

US 2003/0131723 A1 Jul. 17, 2003

Related U.S. Application Data

(63) Continuation-in-part of application No. 10/052,187, filed on Jan. 17, 2002.

(51) Int. Cl.[7] ............................................. F02B 59/00
(52) U.S. Cl. .................. 123/44 B; 123/43 C; 417/462; 91/492
(58) Field of Search ............................. 123/44 B, 43 C; 417/462; 91/492

(56) References Cited

U.S. PATENT DOCUMENTS

| 3,438,358 A | * | 4/1969 | Porsch et al. ............... 123/241 |
| 3,923,013 A | * | 12/1975 | Myers ......................... 123/241 |
| 3,927,647 A | * | 12/1975 | Blackwood ................. 123/43 C |
| 4,038,948 A | | 8/1977 | Blackwood |
| 4,109,618 A | * | 8/1978 | Daniels ....................... 123/43 C |

* cited by examiner

Primary Examiner—Charles G. Freay
Assistant Examiner—William H. Rodriguez
(74) Attorney, Agent, or Firm—David Kiewit

(57) ABSTRACT

A rotary power device of the swinging piston type has a cylindrical rotor mounted between internal and external portions of a stator. The internal stator provides intake and exhaust channels and may hold an igniter. The external stator includes two axially adjacent cam tracks with diametrically opposed eccentricities with respect to the axis of rotation. The rotor includes two axially spaced sets of sector-shaped compartments arranged at equal angular intervals around the inner stator, where each set is axially aligned with a respective cam track. Each compartment is open at the periphery of the rotor and has an inner opening aligned with ports in the internal stator. A sector-shaped piston mounted in each compartment pivots about an axis at one vertex of the compartment. Each piston includes a roller follower for engaging the respective cam track as the rotor rotates. The rotary power device may be configured as a two-phase internal combustion engine, a compressor, a motor-driven pump, a fluid-driven pump or compressor, or a hydraulic motor by modifying the central internal stator.

38 Claims, 14 Drawing Sheets

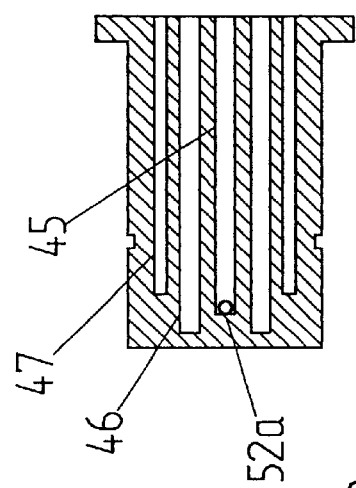
FIG. 8g
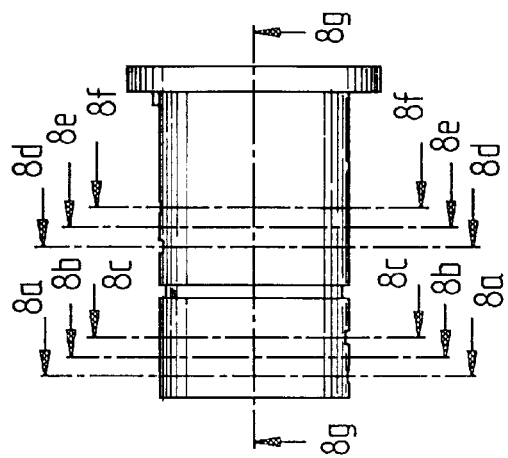
FIG. 8s
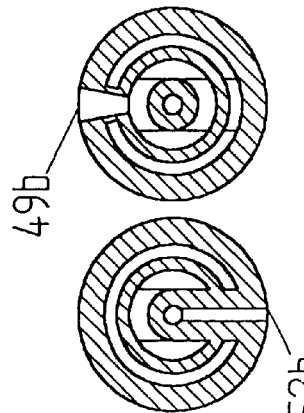
FIG. 8f
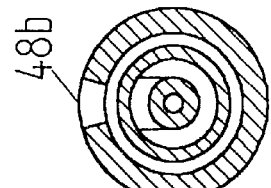
FIG. 8e
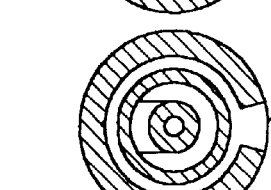
FIG. 8d
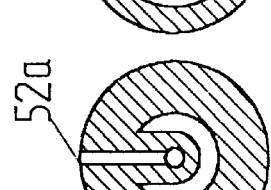
FIG. 8c
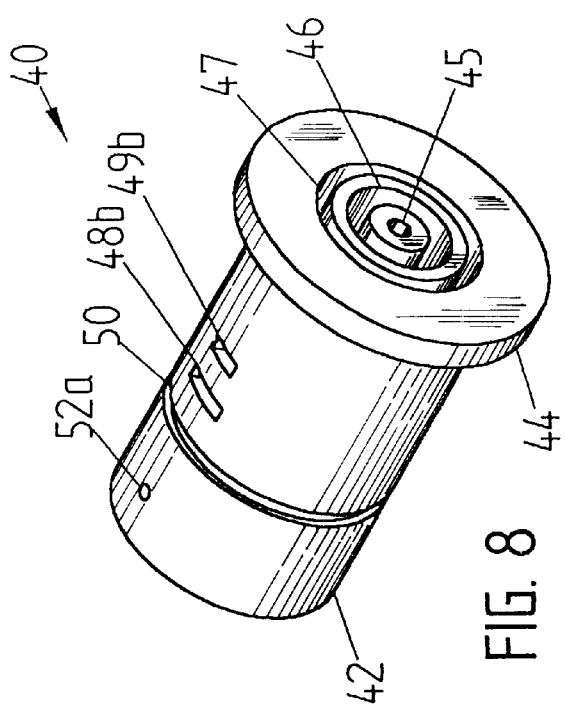
FIG. 8
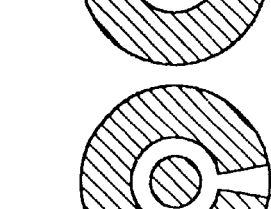
FIG. 8b
FIG. 8a

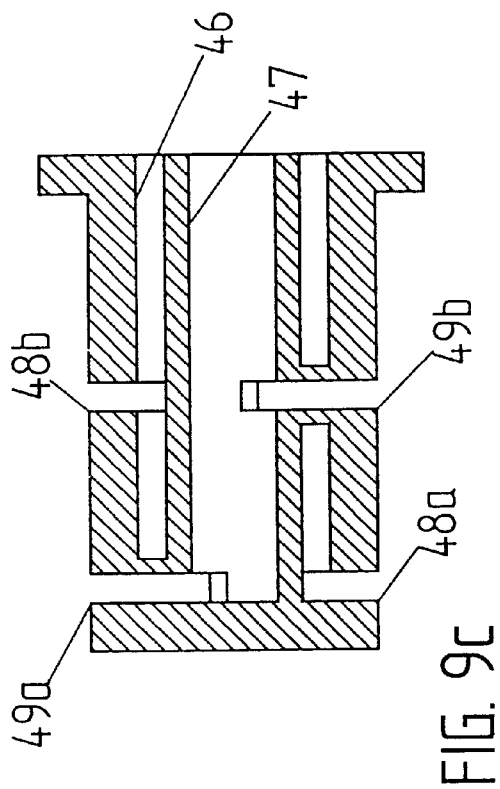
FIG. 9c
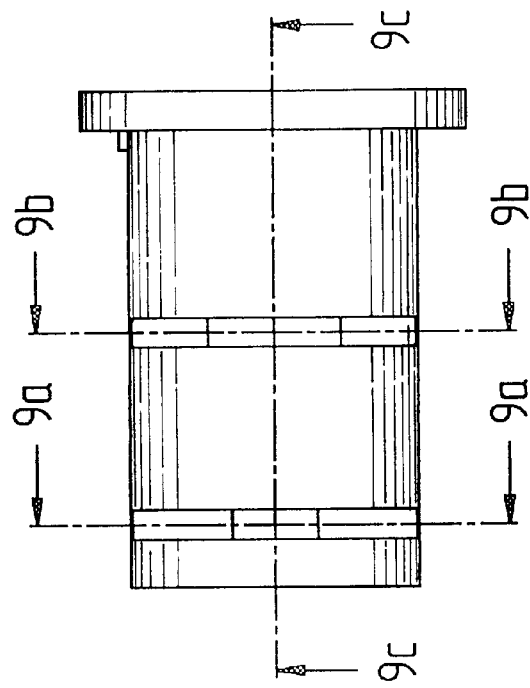
FIG. 9s
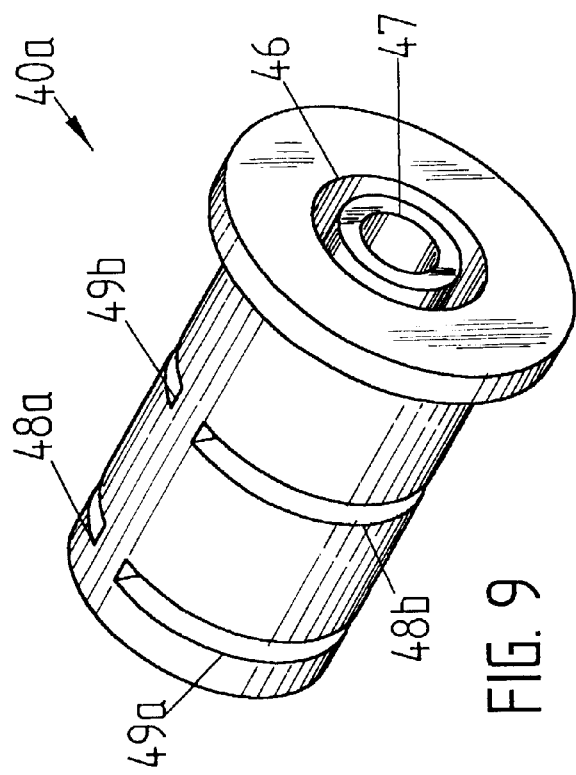
FIG. 9
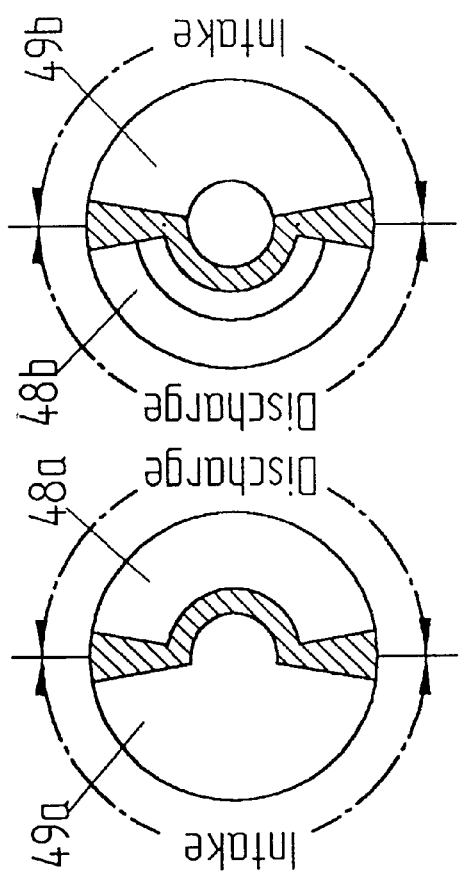
FIG. 9b
FIG. 9a

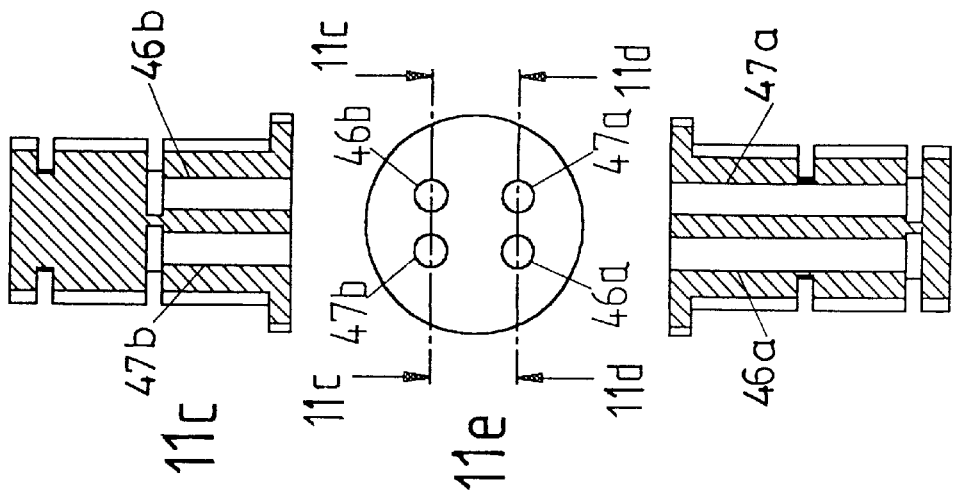
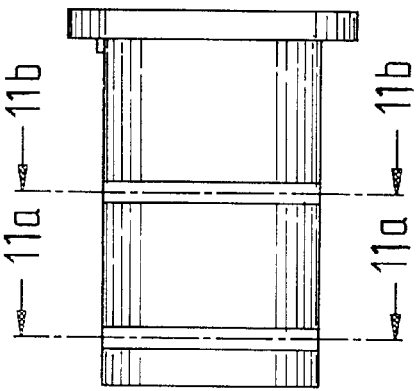
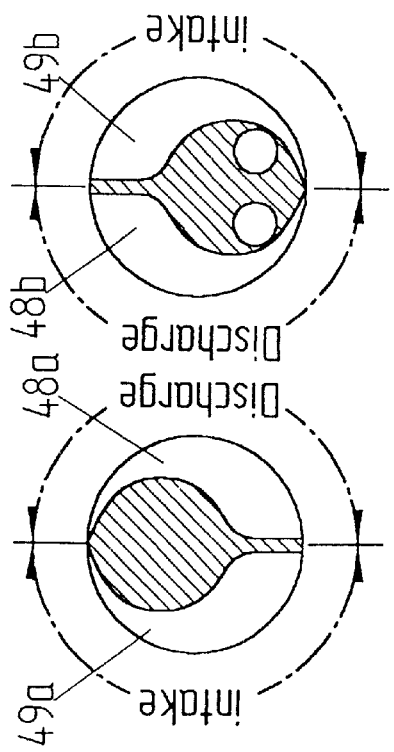
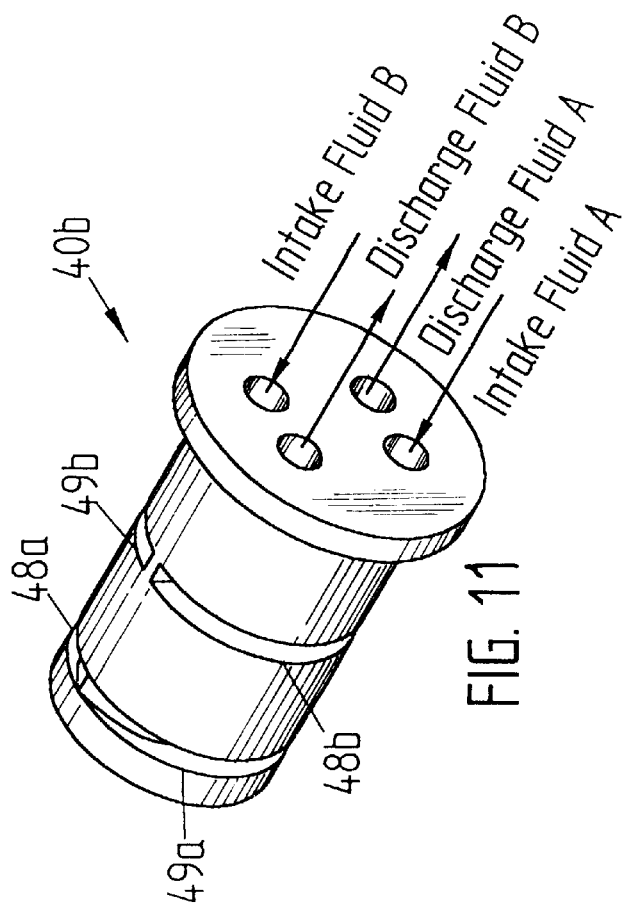

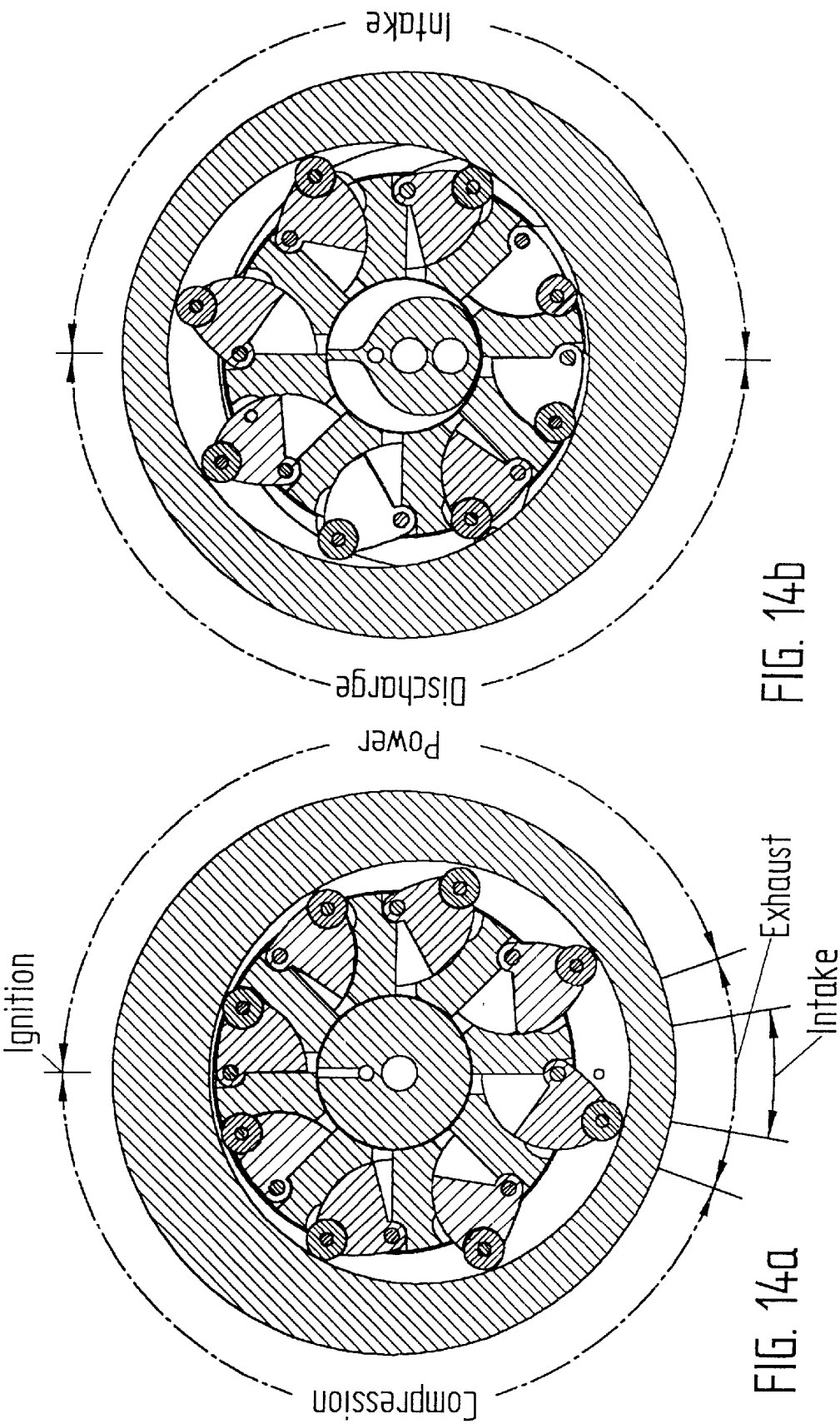

PIVOTING PISTON ROTARY POWER DEVICE

CROSS REFERENCE TO RELATED APPLICATIONS

This application is a continuation-in-part of the inventor's U.S. patent application having Ser. No. 10/052,187, which was filed on Jan. 17, 2002. The disclosure of application Ser. No. 10/052187 is herein incorporated by reference.

FIELD OF INVENTION

The invention relates to rotary power devices, and more particularly to internal combustion engines, pumps, compressors, fluid-driven motors, fluid-driven compressors and pumps and throttling devices in which the rotor includes at least two pivoting pistons.

BACKGROUND

This invention relates to a rotary power device comprising pivotable swingable pistons. Such devices are characterized in having pistons or vanes that execute angular reciprocating movement within chambers in a rotating member and that engage a cam track. An example of rotary devices of the above type can be found in U.S. Pat. No. 4,038,948 to Blackwood. Some of these types of devices can function as internal combustion engines in which gas is initially entrapped within a rotor chamber as a piston swings outward towards a cam surface receding from the rotor and is then compressed when the piston swings inward as the cam surface approaches the rotor. The compressed gases ignite at minimum volume and the ignited gases exert a force on the outwardly swinging piston which, in turn, exerts a force through roller cam followers on the relatively inclined cam track, the reaction to which provides the necessary torque to rotate the rotor. Although such power devices have been proven to be theoretically functional, they are characterized in some respects with complexities associated with cam arrangement, piston shape, and inlet and outlet arrangements, all of which make them costly to manufacture, assemble, and maintain.

SUMMARY OF THE INVENTION

A preferred pivoting piston rotary power device of the invention comprises a stator and a rotor. The preferred stator includes a tubular external stator portion defining an internal volume having at least one pair of cam tracks spaced apart along an axis of rotation. These cam tracks have diametrically opposed eccentricities with respect to the axis. The internal volume is defined by a tubular middle portion, a front end portion and a back end portion of the external portion of the stator. The front end portion has a central throughhole for receiving a shaft and the tubular middle portion has at least two elliptical cam tracks disposed on its inner surface. There is also an internal cylindrical stator portion projecting from the back end wall portion into the internal volume along an axis of the device. The preferred internal stator portion has a plurality of passageways formed in it, each of which comprises a channel parallel to the axis communicating with at least one respective radial port formed in a periphery of the internal stator. The rotor comprises a shaft extending along the axis of the device and journaled within the central throughhole in the front end portion of the stator. The rotor also comprises a cylindrical block having a central cylindrical bore for receiving the internal stator. The block is rotatable within that portion of the internal volume lying between the internal stator portion and the external stator portion. The block further comprises at least two working compartments spaced apart along the axis of the device so that each is associated with a respective one of the cam tracks. In preferred embodiments, the block comprises at least two sets, arranged as circular arrays, of a selected number of working compartments equi-angularly spaced apart about the axis of the device. Each of these working compartments preferably defines a respective sector of a respective hollow cylinder having a respective cylinder axis disposed parallel to the axis of the device and proximal to the periphery of the rotor. Moreover, each compartment is open to an outer peripheral surface of the block and has a radial, inwardly directed, opening communicating with the central cylindrical bore. In addition, the preferred device comprises twice the selected number of pivoting piston assemblies, each of which comprises a respective sector-shaped portion of a solid cylinder received in a respective working compartment, and having a respective pivot axis coinciding with the respective cylinder axis of the working compartment in which it is received. Each piston assembly also comprises a roller cam follower for engaging the respective cam track on the inner wall of the middle portion of the external stator.

Alternate embodiments of the invention can be made by adding additional pairs of cam tracks to the external stator and additional pairs of arrays of working compartments and piston assemblies to the rotor. Thus, more generally, a device of the invention comprises an external stator portion comprising a chosen even number, equal to or greater than two, of eccentric cam tracks disposed on an inner surface thereof, and a rotor comprising the chosen even number of working compartments axially spaced apart so that each of the working compartments is associated with a respective one of the cam tracks. The device moreover comprises a plurality of pivoting piston assemblies, each piston assembly received in a respective working compartment and comprising a roller cam follower for engaging the cam track associated with the compartment in which it is received.

A general object of the present invention is to provide an improved two-phase swinging piston rotary power device that can overcome the problems presently encountered in this class of rotary engines.

Another general object of the invention is to provide a rotary power device light in weight, small in size and having a minimum number of parts.

A more specific object of the invention is to provide a family of rotary power devices that can be easily converted from one type to another, such as a pump, compressor, hydraulic motor, fluid driven pump or compressor, or a compound internal combustion engine and compressor by a simple modification or replacement of a central stationary member.

These and other objects and advantages of the present invention will be apparent from the following detailed description and the appended claims.

BRIEF DESCRIPTION OF THE DRAWINGS

FIG. 5S is a sectional view taken along line 5S—5S of FIG. 5.

FIG. 8 is an isometric view of the internal stator of the rotary power device of FIG. 1.

FIG. 8s is a side view of the internal stator of FIG. 8.

FIG. 8a is a sectional view taken along line 8a—8a of FIG. 8s.

FIG. 8b is a sectional view taken along line 8b—8b of FIG. 8s.

FIG. 8c is a sectional view taken along line 8c—8c of FIG. 8s

FIG. 8d is a sectional view taken along line 8d—8d of FIG. 8s.

FIG. 8e is a sectional view taken along line 8e—8e of FIG. 8s.

FIG. 8f is a sectional view taken along line 8f—8f of FIG. 8s.

FIG. 8g is a sectional view taken along line 8g—8g of FIG. 8s.

FIG. 9 is an isometric view of an alternative central internal stator 40a of a rotary power device of the invention arranged to function as a two-phase pump, compressor, or fluid-driven motor.

FIG. 9s is a side elevation view of FIG. 9.

FIG. 9a is a sectional view taken along line 9a—9a of FIG. 9s.

FIG. 9b is a sectional view taken along line 9b—9b of FIG. 9s.

FIG. 9c is a sectional view taken along line 9c—9c of FIG. 9s.

FIG. 11 is an isometric view of an alternative internal stator 40b used in a rotary power device functioning as a fluid-driven pump or compressor FIG. 11s is a side elevation view of the device of FIG. 11.

FIG. 11a is a sectional view taken along line 11a—11a of FIG. 11s.

FIG. 11b is a sectional view taken along line 11b—11b of FIG. 11s.

FIG. 11c is a sectional view taken along line 11c—11c of FIG. 11e.

FIG. 11d is a sectional view taken along line 11d—11d of FIG. 11e.

FIG. 11e is an end view of the alternative internal stator of FIG. 11.

FIG. 13b is a sectional view taken along line 13b—13b of FIG. 13e.

FIG. 14a is a sectional view taken along line 7a—7a of FIG. 6 of a rotary power device employing the alternative internal stator 40c of FIG. 13.

FIG. 14b is a sectional view taken along line 7b—7b of FIG. 6 of a rotary power device employing the alternative internal stator 40c of FIG. 13.

DETAILED DESCRIPTION OF THE INVENTION

Figure 1:
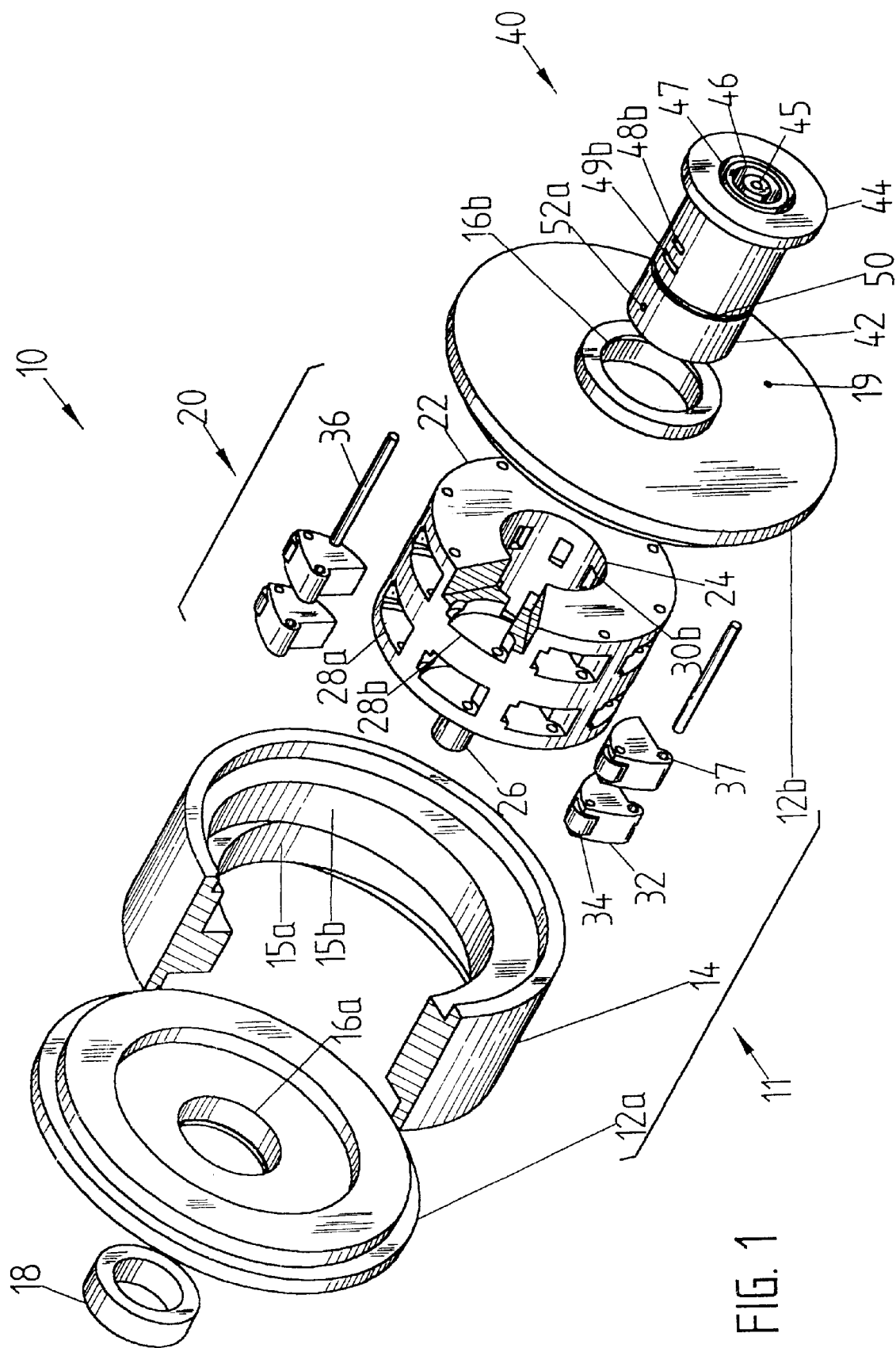
FIG. 1 is an exploded isometric view of the rotary power device.
Figure 2:
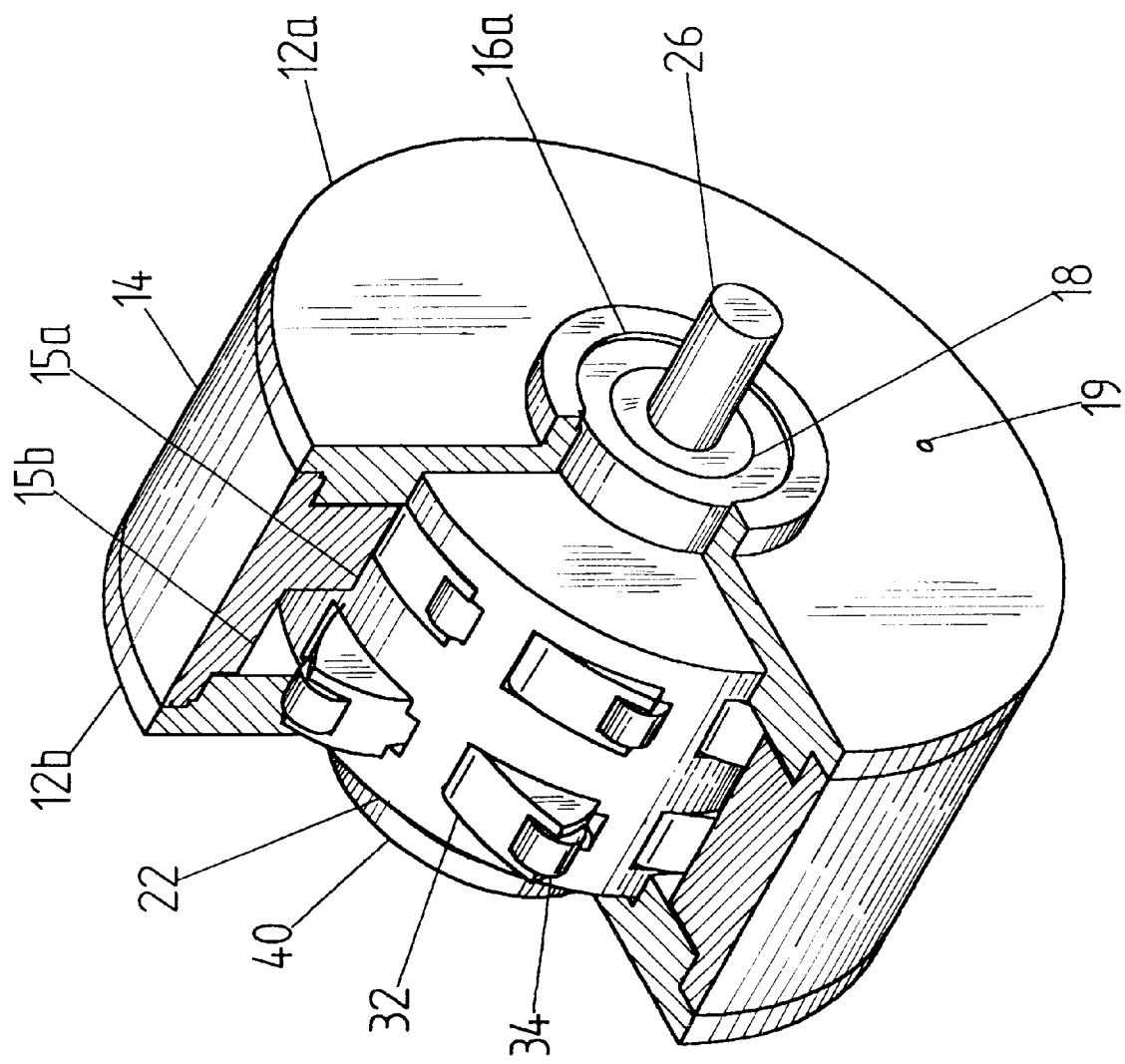
FIG. 2 is an isometric view of the rotary power device having portions of the outer housing, cams, and rotor cut away for purposes of illustration.
Figure 3:
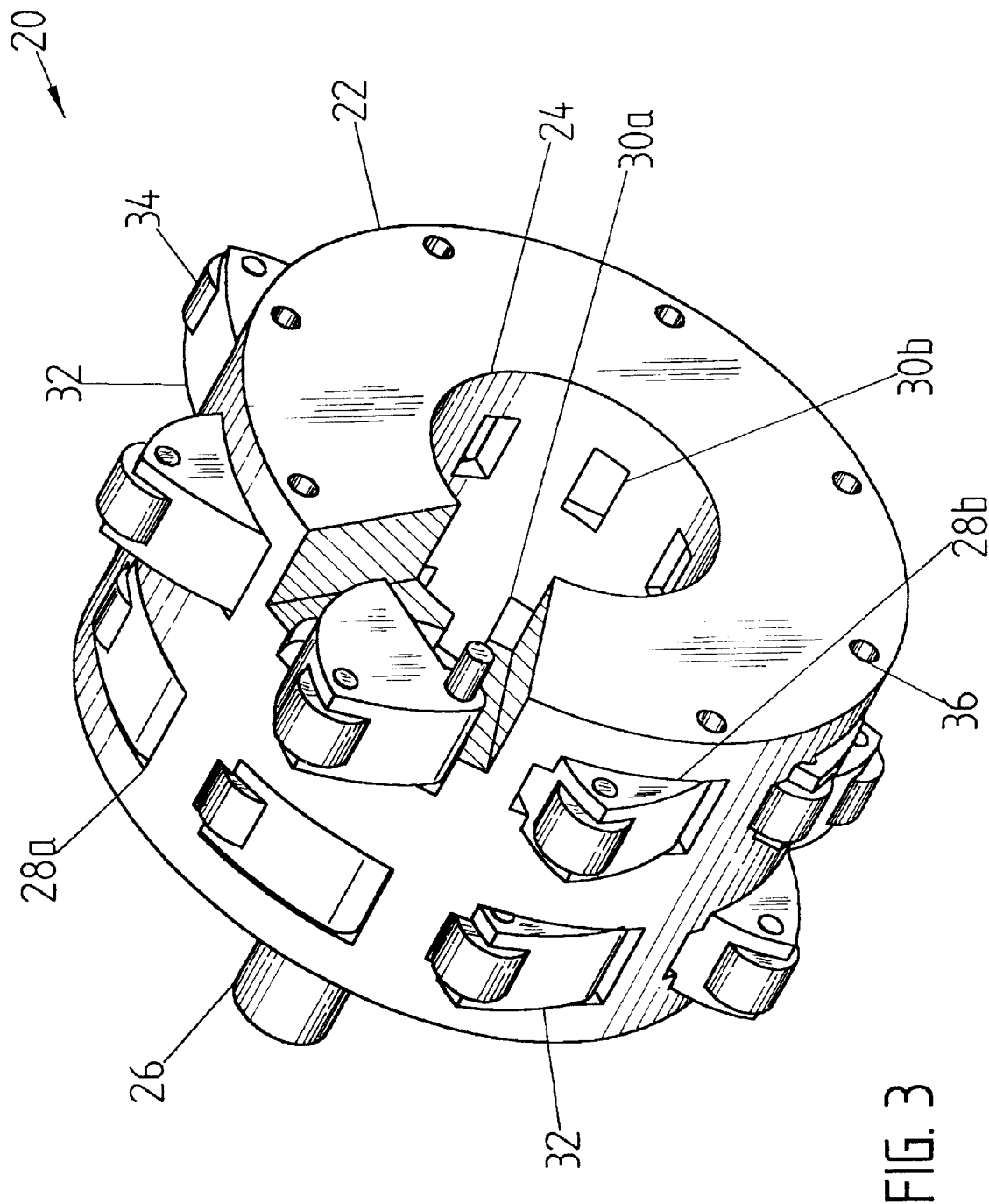
FIG. 3 is an isometric view of the rotor-piston assembly with a portion cut away for purposes of illustration.
Figure 4F:
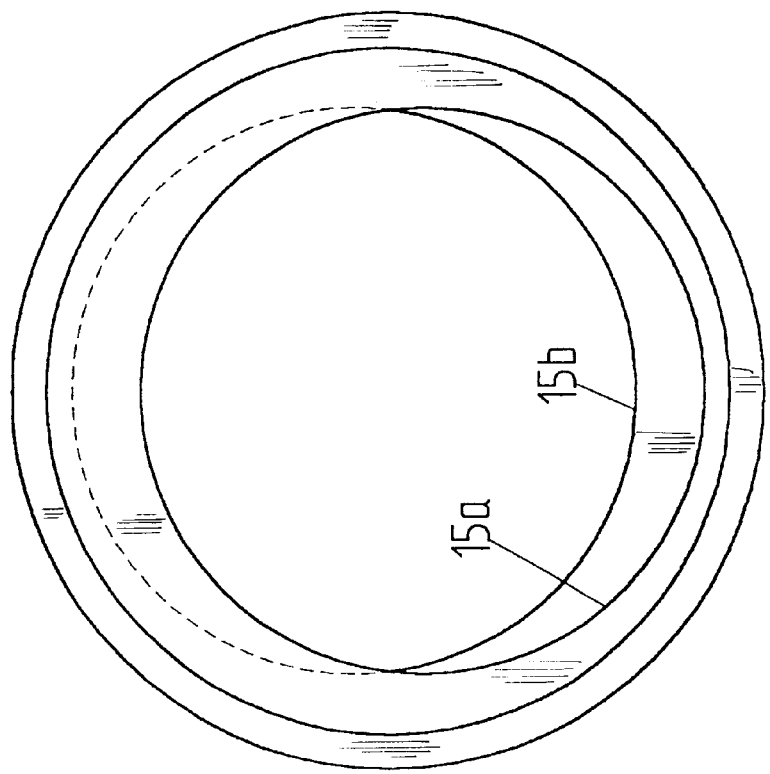
FIG. 4f is a front-end view of FIG. 4.
Figure 4:
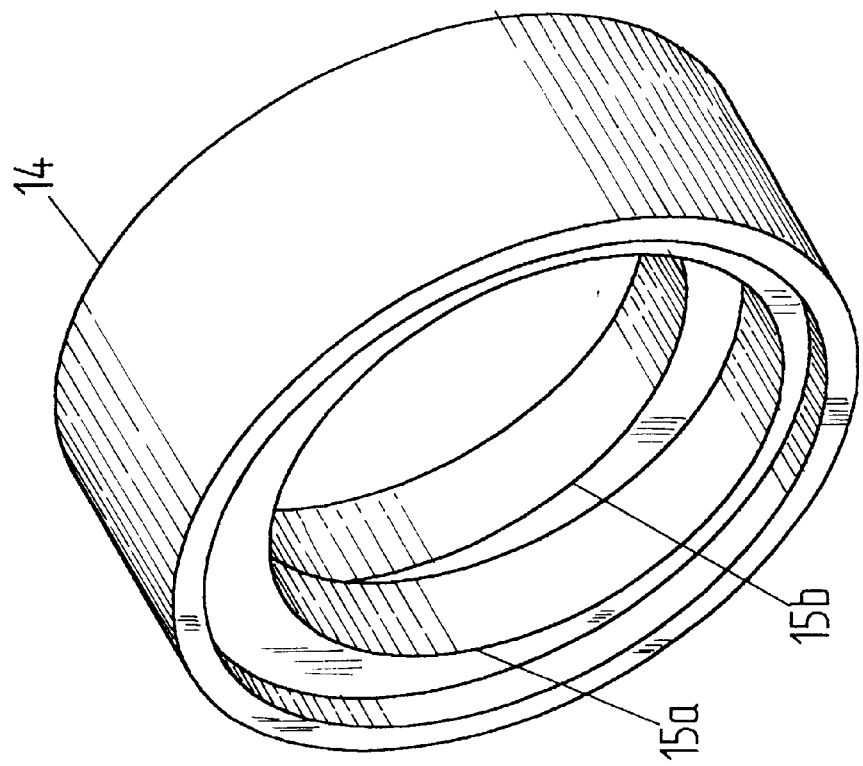
FIG. 4 is an isometric view of the two eccentric cam tracks of the rotary power device of FIG. 2.
Figure 5:
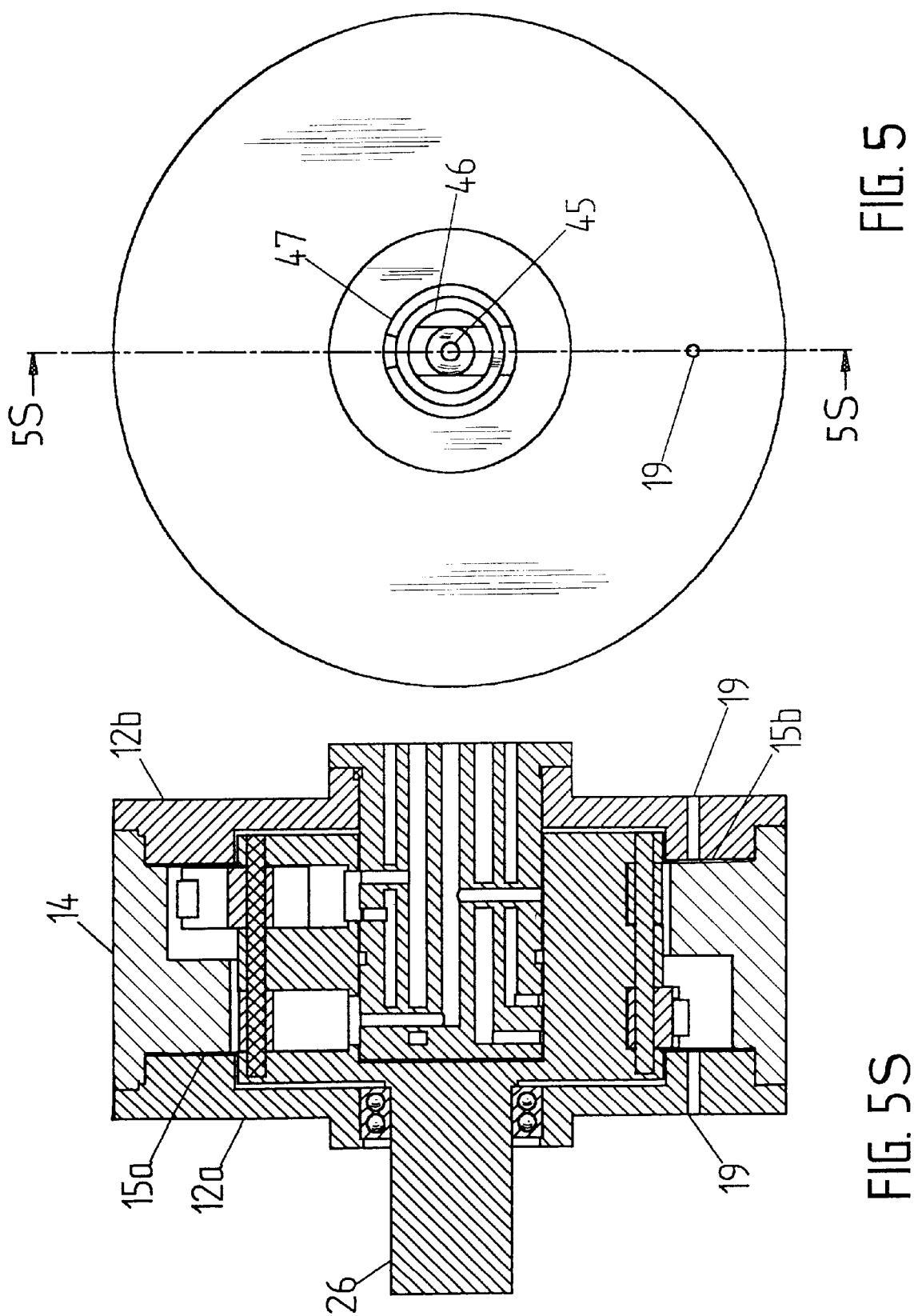
FIG. 5 is an end view of the rotor of the rotary power device of FIG. 2.
Figure 6:
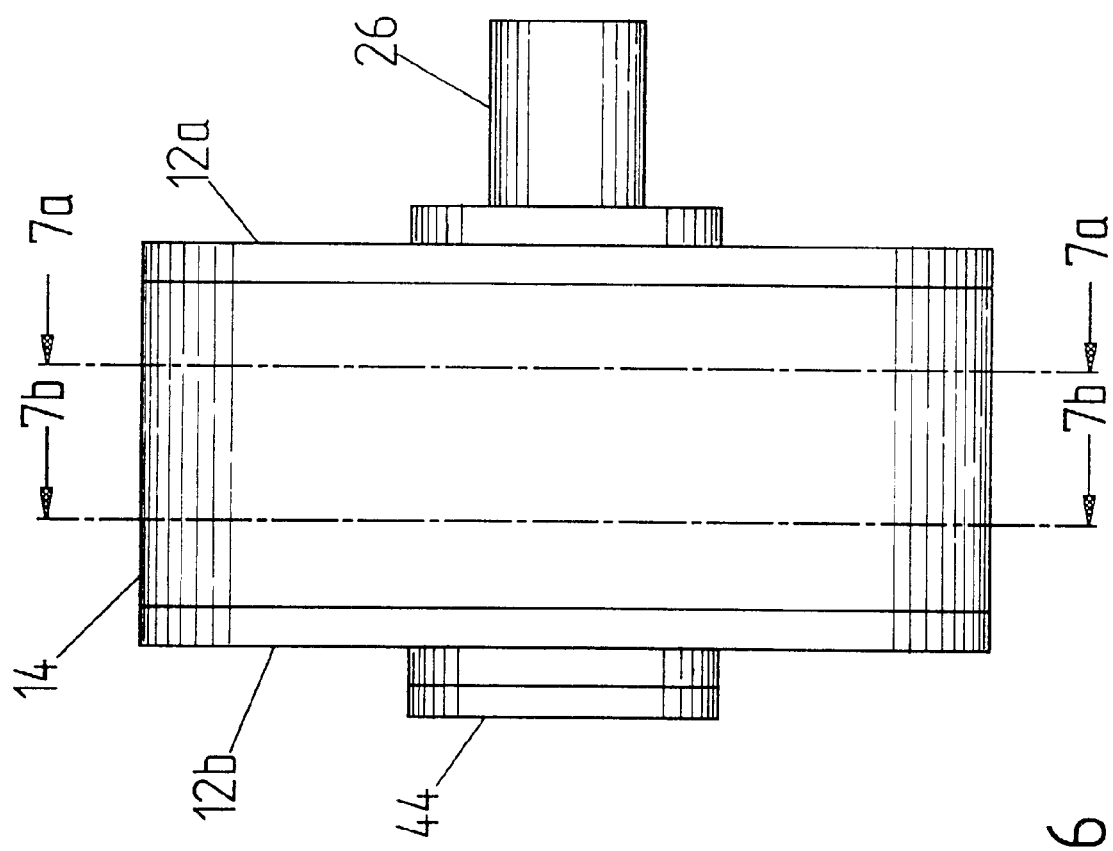
FIG. 6 is a side view of the rotary power device of FIG. 2.
Figure 7B:
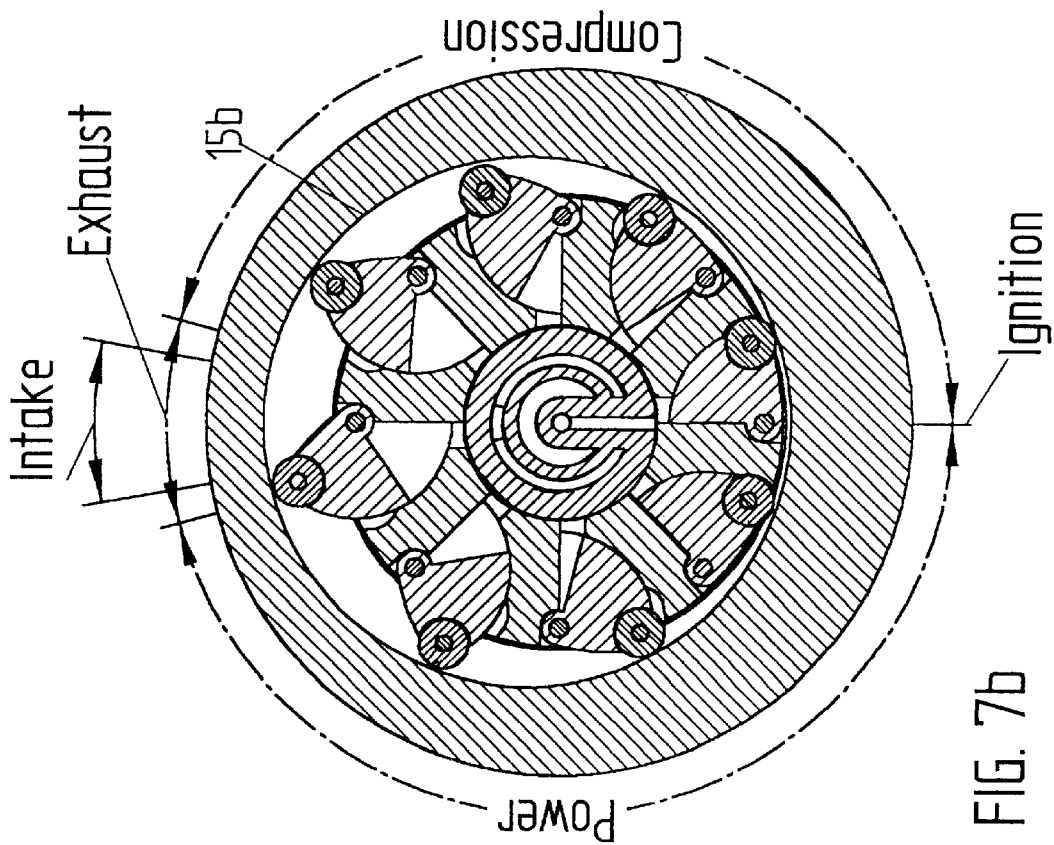
FIG. 7b is a sectional view taken along line 7b—7b of FIG. 6.
Figure 7A:
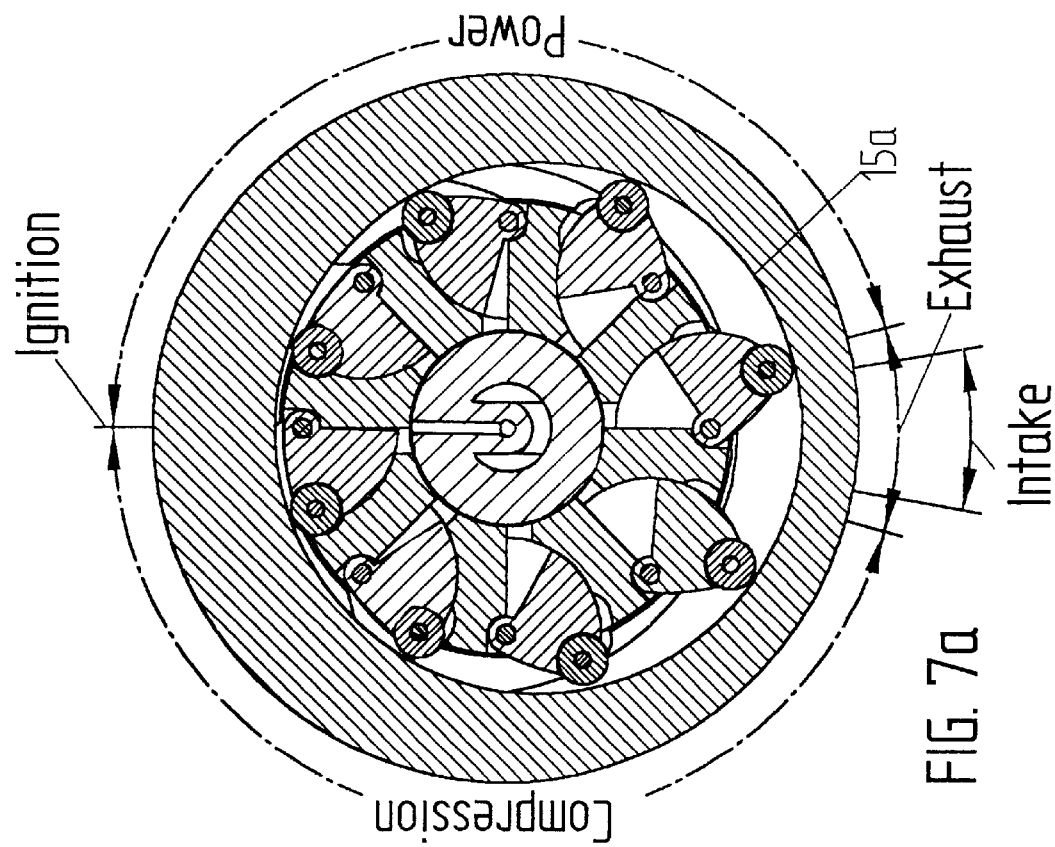
FIG. 7a is a sectional view taken along line 7a—7a of FIG. 6.

In the drawing some of the principles of this invention are illustrated through its application as a two-phase internal combustion engine generally equivalent to a conventional two-stroke compression ignition engine. It will be understood, however, that these principles can be successfully employed to yield other devices such as pumps, compressors, fluid driven motors, fluid-driven pumps or compressors, or a combination of a two-phase internal combustion engine driving a compressor. The change from the depicted engine to one of the other devices involves a conceptually simple modification or replacement of a central stationary portion of the device.

Referring to FIG. 1 through FIG. 8g, one finds a depiction of a preferred rotary power device 10 functioning as a two-phase internal combustion engine and comprising an external stator 11. The external stator, or housing, includes a tubular middle portion 14 comprising within it two axially adjacent eccentric cam tracks 15a and 15b having diametrically opposed eccentricities. The middle portion 14 is affixed to front 12a and back 12b end plates by bolts or other suitable fixturing means (not shown) known to those skilled in the mechanical arts . The front plate 12a comprises a central through opening 16a and bearing 18 within which an end shaft 26 extending outwardly from one end of the rotor 20 is journaled for rotation. Those skilled in the mechanical arts will appreciate that one may choose to form the shaft integrally with the rotor, or may make it as a separate member that is then fixedly attached to the rotor. The back end plate 12b comprises a central opening 16b for receiving an internal stator 40 that extends along an axis of the device.

The central internal stator 40 comprises a cylindrical portion 42 protruding through the interior of the housing from the opening 16b in the end plate 12b and fixedly attached to the end plate through the flange portion 44 by bolts or other suitable fixturing means (not shown). The preferred internal stator comprises axially extending annular intake 46, annular exhaust 47, and central fuel injection or ignition 45 channels. These channels may be connected to appropriate respective external conduits (not shown) fixedly attached to the flange portion 44. Each of the intake and exhaust channels is connected to a respective radially oriented intake 49a, 49b or exhaust 48a, 48b port that comprises another portion of the respective passageway. Each pair of intake and exhaust ports form axially spaced apart adjacent ports in communication with respective sets of working compartments. One pair of intake and exhaust ports is disposed at a 180-degree phase relation, or, diametrically opposed with respect to the second pair. The exhaust port in each pair is configured to have a wider angular extent than the corresponding intake port to allow for enhanced scavenging. A pair of ignition or fuel injection ports 52a and 52b, communicating with a common axial ignition channel 45, are preferably disposed approximately diametrically opposite to a respective pair of intake and exhaust ports. Those skilled in the art will recognize that although the preferred embodiment discussed subsequently herein employs spontaneous ignition of a fuel charge, that another igniting means, such as the spark plug described in the inventor's U.S. patent application Ser. No. 10/052187, could also be employed. Moreover, the lateral surface of the internal stator 40 may preferably include a recess 50 adapted to receive a sealing ring (not shown).

In the tubular space between the central cylindrical internal stator 40 and the inner wall of the external stator of the depicted embodiment, there is a cylindrical rotor assembly 20, which comprises a cylindrical block 22 having a central bore 24. In an exemplar device the rotor assembly 20 comprises a two sets of compartments 28a and 28b, each of which is open to the outer peripheral surface of the rotor. The compartments in each set are arranged as circular arrays surrounding the bore in an equi-angular arrangement. All of the working compartments in one of the arrays thereof are disposed at the same radial distance from the axis of the shaft. Each compartment is shaped as a sector of a hollow cylinder that is closed at both ends and that has a respective pivot axis disposed near the outer edge of the block and parallel to the axis of rotation of the device. Each compartment communicates with the central bore through respective inward openings 30a and 30b. These inward openings are disposed in axial alignment with lateral ports formed in the internal stator such that each set of inward openings is in communication with a respective pair of intake and exhaust ports and a fuel injection port. A preferred rotor includes an end shaft fixedly secured to one end of the rotor 26 and protruding through the central opening 16a in the end plate 12a. A bearing means 18 in the end plate 12a rotatably carries the end shaft. A sector-shaped piston assembly 32 is preferably pivotally mounted within each compartment by means of the piston pinhole 37 and piston pin 36. The piston assemblies include cam followers 34 for constantly engaging the respective eccentric cam tracks 15a and 15b while executing a swinging movement about the pivot axis or pin 36. This results in varying the volume of the sector-shaped compartment as the rotor rotates.

Although the depicted embodiment comprises two sets of working compartments arranged as circular arrays spaced out along the axis of rotation, it should be recognized that a rotary two-phase engine analogous to a conventional two-cylinder, two-cycle engine could be made by having only one working compartment respectively associated with each of the axially spaced apart cam tracks. That is, the preceding description of an engine having an even number of arrays of cylinders applies equally well to the limiting case in which each set of working compartments consists of a single compartment. However, because of the eccentricity of the cam tracks, a two-phase engine of the invention that used a single working compartment, or a single array of working compartments, would be dynamically unbalanced. Hence, if only two working compartments are to be used, they are disposed in an axially displaced arrangement so that each of them is aligned with a different one of two cam tracks.

Lubrication of the sliding piston surfaces may be performed by conveying a lubricating fluid, such as oil, through a port 19 in one end opening. The lubricating fluid may be withdrawn through a port (not shown) in the middle portion 14 of the external stator. The lubricating fluid may additionally serve as a coolant fluid, in which case the withdrawn lubricating fluid is preferably cooled by an external heat exchanger or other means (not shown) and then reconveyed to port 19.

In operation as a two-phase internal combustion engine, a starter motor (not shown) is connected to the shaft 26 to initiate the rotation of the rotor 20 and to thereby start the engine. A step by step explanation of the operation of an exemplary device is made with reference to FIG. 7b and FIGS. 8d–8f by tracing one piston and its respective volume changes as the rotor completes one revolution. Assuming a clockwise rotation of the rotor, the piston at the bottom of the figure is at its most retracted position in which the compartment volume is at its minimum value and the temperature of the compressed air is at its maximum value. A fuel injection means can then be used to inject a fuel charge from the port 52b so as to cause spontaneous ignition, which initiates the power expansion phase extending over one hundred sixty degrees of the rotor rotation in the present design. During the power phase, the inward opening 30b remains blocked by the lateral surface of the internal stator 40 and the component of the reaction force of the cam 15b on the outwardly retracting piston roller follower 34 imparts the necessary torque to the rotor. Subsequently, the exhaust phase commences in which the inward opening 30b aligns with an exhaust port 48b, which extends over forty degrees of the rotor rotation in the present design. Subsequent to the start of the exhaust phase by some predetermined angular interval (preferably ten degrees), the inward opening 30b aligns simultaneously with both an intake port 49b and an exhaust port 48b over a twenty degree angular interval. During this overlapping angular interval of the rotor rotation, a scavenging process takes place in which incoming air displaces the combustion products. Subsequent to the exhaust phase, the compression phase commences over an angular interval (preferably one hundred sixty degrees) during which the inward opening 30b is blocked again by the lateral surface of the internal stator and the piston starts retracting inwardly towards its minimum, which completes the cycle. The angular extent of the power, compression, exhaust and scavenging phases can be varied with different designs and the selection made in the present design are only an example of a preferred embodiment. The operational process in the second array of compartments as depicted in FIG. 7a and FIG. 8a–8c is similar, but is executed with a phase shift of one hundred eighty degrees with respect to the angular setting of the first array of compartments In some preferred embodiments, the exhaust port associated with a selected array of working compartments extends over a greater angular interval than does the associated intake port.

The rotary power device 10 can be easily converted to serve a different function than that of an internal combustion engine by simply replacing the internal stator 40. A rotary power device employing the modified central internal stator 40a, shown in FIG. 9, can function as a compressor, a pump, or a fluid-driven motor. In this configuration, the central internal stator may comprise two axially spaced apart pairs of intake and discharge, or exhaust, ports (48a, 49a) and (48b, 49b) where each pair consists of angularly adjacent intake and discharge ports, and where each port extends over substantially one hundred eighty degrees of arc. The two intake ports are connected to an axial intake channel 47 and the two discharge ports are connected to an axial discharge channel 46. The two channels may be constructed so as to be concentric so that one annular channel surrounds a central circular channel.

Figure 10B:
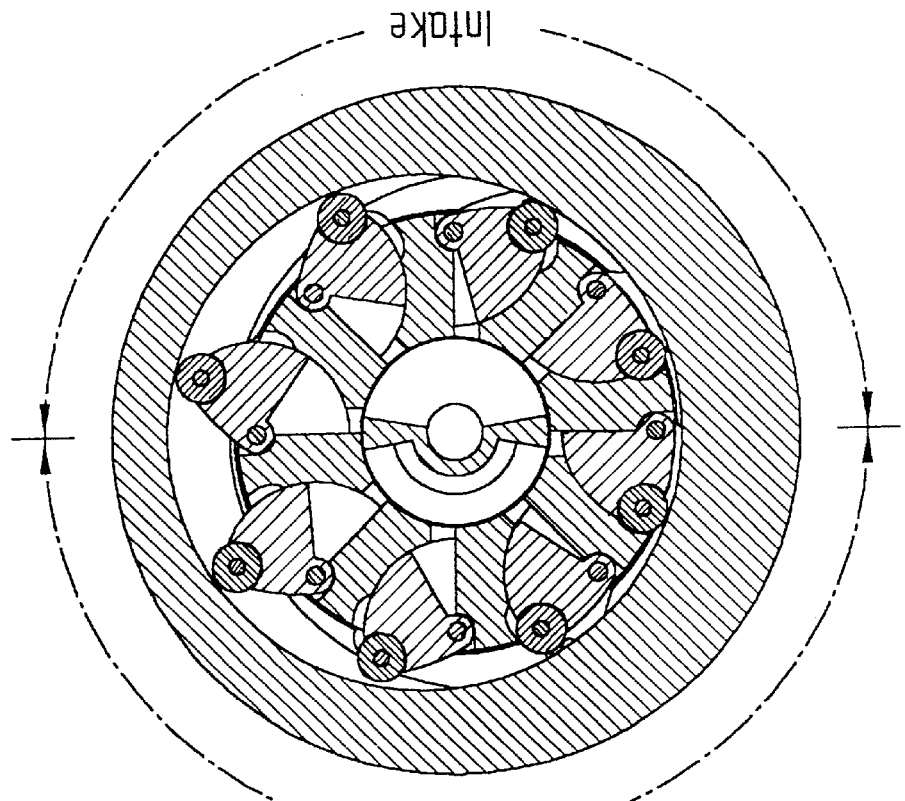
FIG. 10b is a sectional view taken along line 7b—7b of FIG. 6 of a rotary power device employing the alternative internal stator 40a of FIG. 9.
Figure 10A:
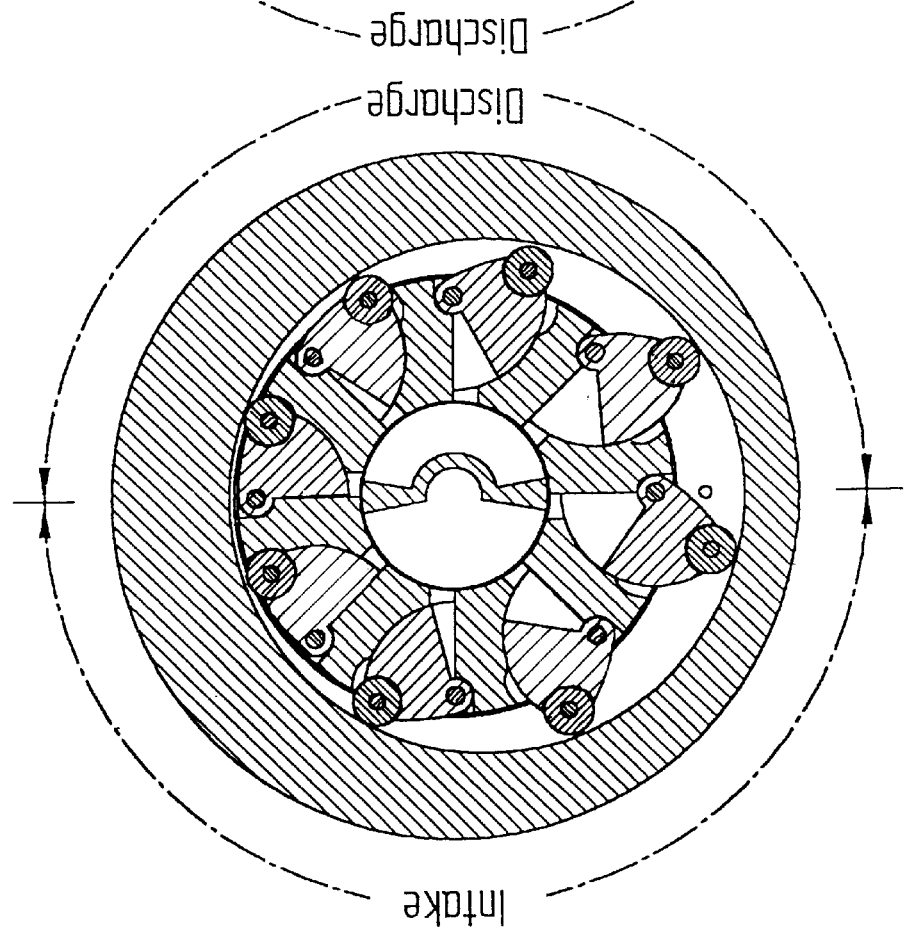
FIG. 10a is an alternative sectional view taken along line 7a—7a of FIG. 6 for rotary power device employing an alternative internal stator 40a of FIG. 9.

In operation as a pump or compressor, the rotor is made to rotate by coupling the end shaft 26 to a driving means, such as a motor. As depicted in FIG. 10a and FIG. 10b, each time the rotor completes one revolution, each rotor compartment performs one intake phase and one discharge phase, each of which spans a one hundred eighty degree angular displacement of the rotor. During the intake phase the piston pivots outwardly and the inward openings 30a and 30b register with intake ports 49a and 49b, respectively. Similarly, during the discharge phase the piston pivots inwardly and the inward opening 30a and 30b registers with discharge ports 48a and 48b, respectively. During the rotation of the rotor, the piston follower rollers 34 maintain contact with the respective eccentric cam track by the effect of centrifugal force, which causes each piston to angularly reciprocate within its respective compartment as the rotor rotates. At any given instant, each array of compartments in the rotor performs simultaneous intake and discharge phases divided equally among the rotor compartments.

In functioning as a fluid driven motor, such as a hydraulic or pneumatic motor, a pressurized fluid source (not shown) is connected to the axial intake channel 47. The fluid pressure forces exerted on the piston surfaces during the intake phase in which inward openings 30a and 30b register with intake ports 49a and 49b causes those pistons to swing outwardly. The reaction forces of the relatively inclined surface of the cam track on the piston roller followers 34 provides the necessary torque to cause rotation of the rotor. These reaction forces are transmitted through cam followers 34, pistons 32 and pin 36. At the same time, the depressurized fluid is expelled from rotor compartments as the pistons swing inwardly with their inner openings 30a and 30b registering with discharge ports 48a and 48b of the central internal stator 40a.

Figure 12B:
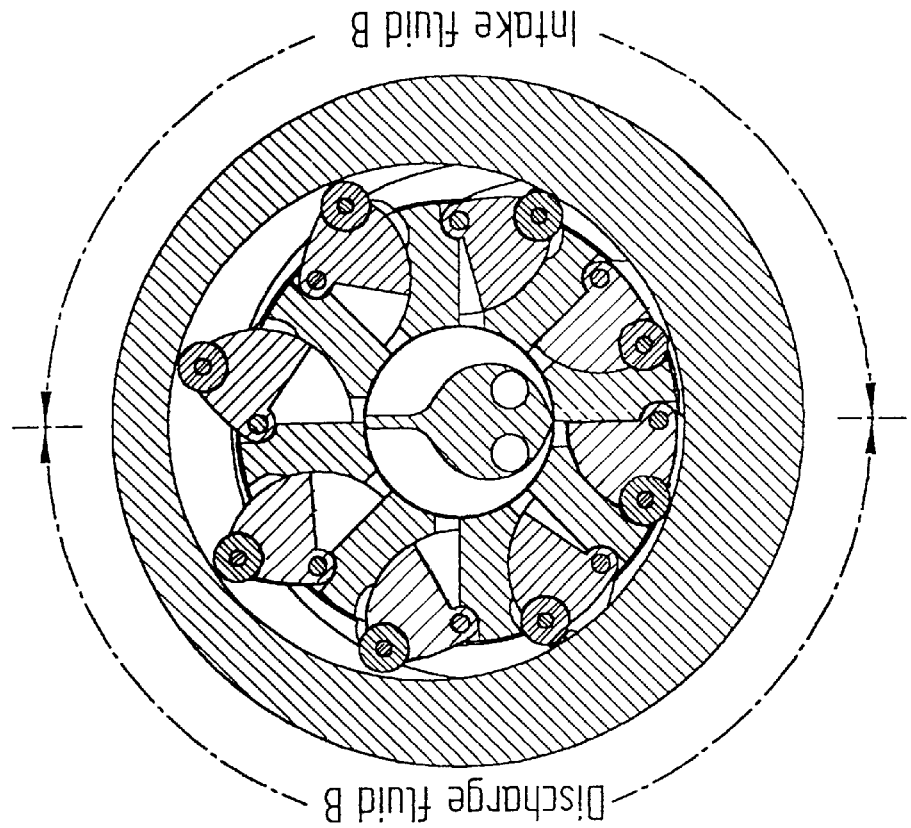
FIG. 12b is a sectional view taken along line 7b—7b of FIG. 6 of a rotary power device employing the alternative internal stator 40b of FIG. 11.
Figure 12A:
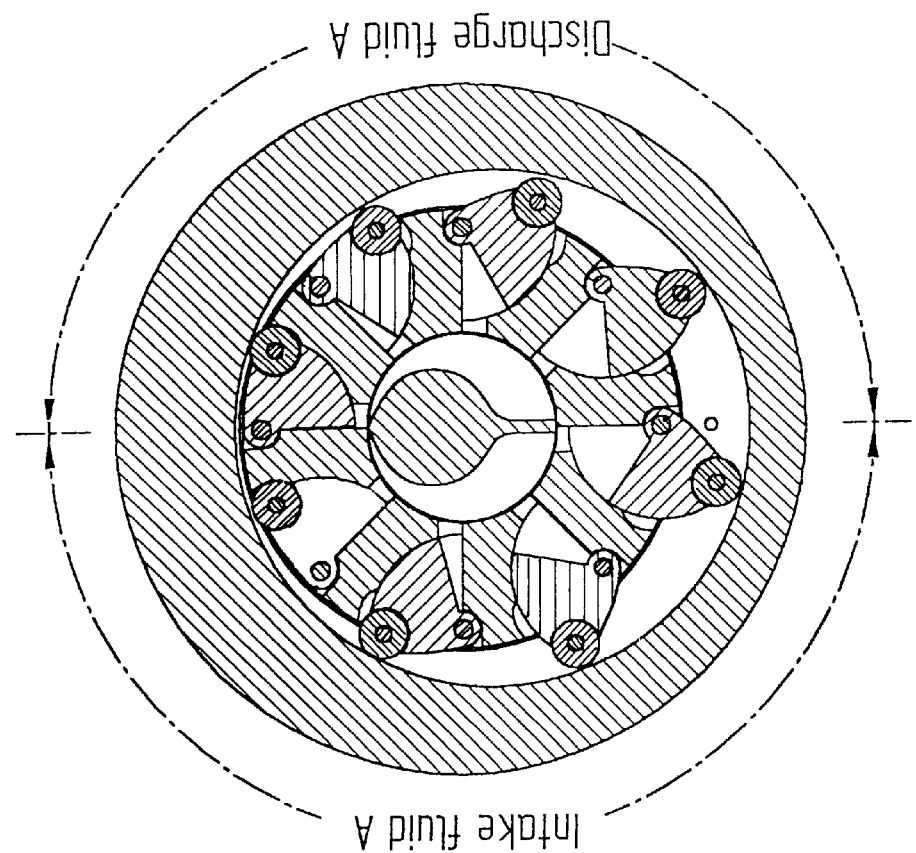
FIG. 12a is a sectional view taken along line 7a—7a of FIG. 6 of a rotary power device employing the alternative internal stator 40b of FIG. 11.

Another embodiment of the rotary power device 10 is a fluid-driven pump or a fluid-driven compressor. In this embodiment, the central stator 40 is replaced with a modified central stator 40b, as depicted in FIGS. 11–11d. The central stator 40b comprises a pair of axial intake and discharge ports 46a and 47a communicating with respective intake and discharge ports 49a and 48a. Similarly, the central stator 40b comprises a second pair of axial intake and discharge channels 46b and 47b connected to respective intake and discharge ports 49b and 48b. One pair of intake and discharge channels is used for one driving fluid (i.e., a motive fluid) of higher pressure, and a second pair of axial intake and discharge channels is used for the driven fluid of lower pressure. In operation as fluid-driven pump or compressor, a significant portion of the fluid pressure energy of the motive fluid is converted to mechanical rotational energy which, in turn, is used to pressurize the second fluid of lower pressure. As depicted in FIG. 12a and FIG.12b, each fluid communicates separately with one array of compartments performing intake and discharge phases.

Figure 13:
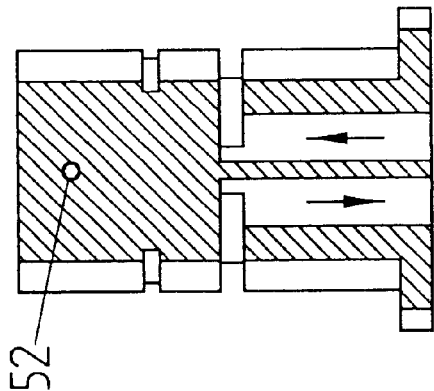
FIG. 13 is an isometric view of an alternative internal stator 40c of a rotary power device of the invention operable as a compound two-cycle internal combustion engine driving a compressor.
Figure 13E:
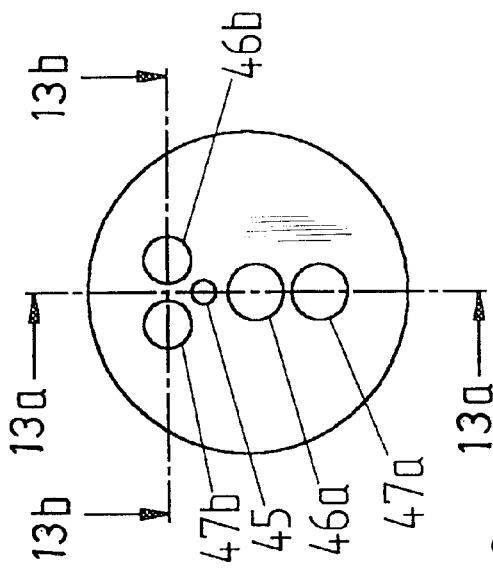
FIG. 13e is an end view of FIG. 13.
Figure 13:
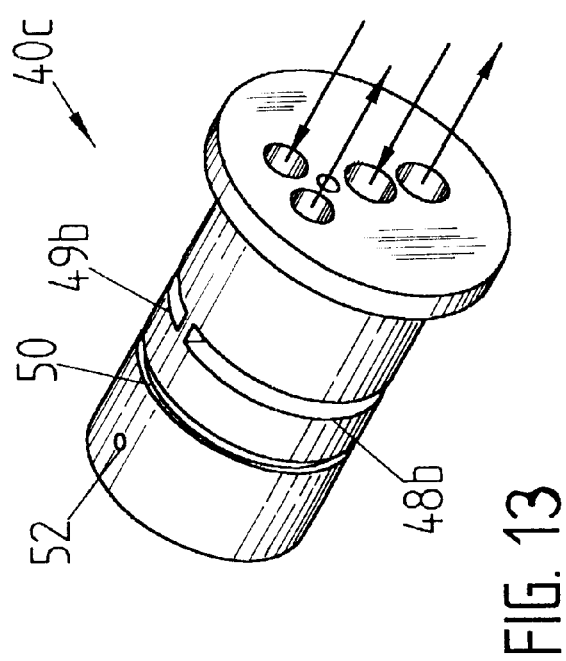
Figure 13A:
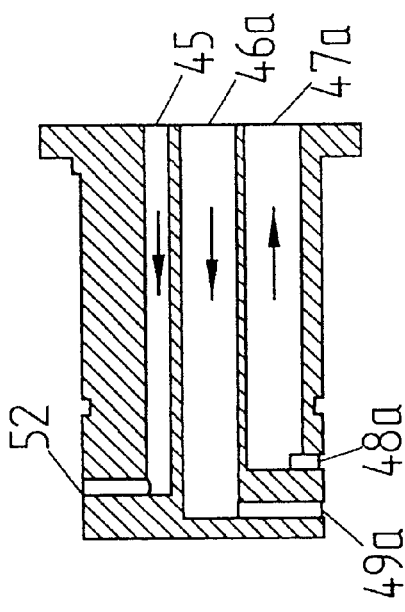
FIG. 13a is a sectional view taken along line 13a—13a of FIG. 13e.

Yet another embodiment of the rotary power device 10 is a device that functions as a dual two-cycle internal combustion engine and a compressor. In this configuration, the internal stator 40 is replaced with a modified internal stator 40c as depicted in FIG. 13. The preferred internal stator 40c comprises an axial intake channel 46b connected to an intake port 49b and a discharge, or exhaust, channel 47b connected to a discharge port 48b. These intake and discharge ports, together with their respective channels, which are in communication with inward openings 30b of one array of rotor compartments (as depicted in FIG. 14b) form the compressor portion of the dual purpose device. Furthermore, the internal stator includes three additional passageways comprising an intake air channel 46a connected to an intake port 49a; an exhaust channel 47a connected to an exhaust port 48a; and a fuel injection channel 45 connected to an injection port 52. The three channels, together with their respective ports, which are in communication with inward openings 30a of the second array of rotor compartments (as depicted in FIG. 14a), form the two-cycle internal combustion engine portion of the dual purpose device.

As will be understood by those skilled in the art, various embodiments other than those described in detail in the specification are possible without departing from the scope of the invention will occur to those skilled in the art. It is, therefore, to be understood that the invention is to be limited only by the appended claims.

What is claimed is:

1. A pivoting piston rotary power device comprising a stator and a rotor, wherein the stator comprises:

a tubular external stator portion defining an internal volume, the external stator portion comprising a tubular middle portion, a front end portion and a back end portion; the front end portion having a central throughhole, the tubular middle portion comprising an even number, equal to or greater than two, of eccentric cam tracks axially spaced apart on an inner surface thereof; and an internal cylindrical stator portion projecting from the back end wall portion into the internal volume along an axis of the device, the internal stator portion having a plurality of passageways formed therein, each of the passageways comprising a channel parallel to the axis, each of the channels communicating with at least one respective radial port formed in a periphery of the internal stator; and wherein the rotor portion comprises:

a shaft extending outwardly from a cylindrical block along the axis of the device, the shaft journaled within the central throughhole in the front end portion of the stator;

the cylindrical block comprising a central cylindrical bore for receiving the internal stator, the block rotatable within that portion of the internal volume lying between the internal stator portion and the external stator portion, the block comprising an even number of sets of working compartments axially spaced apart so that each of the sets is associated with a respective one of the cam tracks, each set comprising a selected number, equal to or greater than one, of working compartments, each working compartment defining a sector portion of a respective cylinder having a respective cylinder axis disposed parallel to the axis of the device, each compartment open to an outer surface of the block, each compartment further having a respective radial inward opening communicating with the central cylindrical bore; and a plurality of pivoting piston assemblies, each piston assembly received in a respective working compartment and having a respective pivot axis coinciding with the respective cylinder axis of the working compartment in which it is received, each piston assembly further comprising a roller cam follower for engaging the cam track associated therewith.

2. The pivoting piston rotary power device of claim 1 wherein
the external stator comprises exactly two eccentric cam tracks and the cylindrical block comprises exactly two sets of working compartments and
the plurality of passageways comprises at least three passageways comprising:
at least one inlet passageway comprising a first radial inlet port communicating exactly once with each radial inward opening in the first set of one or more working compartments in the course of each rotation of the block; the at least one inlet passageway further comprising a second radial inlet port communicating exactly once with each radial inward opening in the second set of one or more working compartments in the course of each rotation of the block;
at least one exhaust passageway comprising one radial exhaust port communicating with each radial inward opening in the first set of one or more working compartments exactly once during each rotation of the block, the at least one exhaust passageway further comprising a second radial exhaust port communicating exactly once with each radial inward opening in the second set of one or more working compartments in the course of each rotation of the block; and
at least one ignition passageway comprising a first ignition port communicating with each radial inward opening in the first set of one or more working compartments exactly once during each rotation of the block, the at least one ignition passageway further comprising a second ignition port communicating with each radial opening in the second set of one or more working compartments exactly once during each rotation of the block;
whereby the pivoting piston rotary power device is adapted to function as a two-phase internal combustion engine.

3. The pivoting piston rotary power device of claim 1 wherein
the external stator comprises exactly two eccentric cam tracks and the cylindrical block comprises exactly two sets of working compartments;
the plurality of passageways comprises at least two passageways comprising:
an inlet passageway comprising a first radial inlet port communicating with each radial inward opening of the first set of one or more working compartments exactly once during each rotation of the block, the inlet passageway further comprising a second radial inlet port communicating with each radial inward opening of the second set of one or more working compartments exactly once during each rotation of the block; and
an exhaust passageway comprising a first radial exhaust port communicating with each radial inward opening of the first set of one or more working compartments exactly once during each rotation of the block, the inlet passageway further comprising a second radial exhaust port communicating with each radial inward opening of the second set of one or more working compartments exactly once during each rotation of the block;
whereby the pivoting piston rotary power device is adapted to function as one of a pump, a compressor, a fluid-driven motor and an expander device.

4. The pivoting piston rotary power device of claim 1 wherein the pivoting piston assembly comprises a predominantly sector-shaped portion of a solid circular cylinder.

5. The pivoting piston rotary power device of claim 1 wherein the selected number of working compartments is at least two.

6. The pivoting piston rotary power device of claim 1 wherein each set of working compartments comprises the selected number, greater than one, of working compartments arranged as a circular array of working compartments equiangularly spaced apart about the axis.

7. The pivoting piston rotary power device of claim 1 wherein each working compartment comprises a hollow cylindrical sector having a respective axis proximal to the periphery of the cylindrical block and having a radius less than the radius of the cylindrical block.

8. A two-phase internal combustion engine having an output shaft extending outwardly from a cylindrical block rotatable about an axis of the shaft, the block received within an external stator having a tubular portion comprising at least two eccentric cam tracks axially spaced apart on an inner surface thereof,
the cylindrical block comprising:
a central cylindrical bore extending through the block along the axis of the shaft; at least two sets of working compartments axially spaced apart so that each of the sets is associated with a respective cam track, each set comprising a predetermined number, equal to or greater than one, of working compartments disposed at a single radial distance from the axis of the shaft, each compartment forming a sector of a hollow cylinder having a respective cylindrical axis parallel to the axis of the shaft, each working compartment open to a peripheral surface of the block, each working compartment further having a respective radial inward opening communicating with the central bore;
a plurality of piston assemblies, each piston assembly movable within a respective working compartment, each piston assembly having at least one cylindrical wall portion, each piston assembly comprising a pivot pin having an axis coincident with the cylindrical axis of the respective working compartment, each piston assembly further comprising a roller cam follower for engaging the associated cam track;
the engine further comprising an internal stator portion received in the cylindrical bore of the block, the internal stator portion having a plurality of passageways formed therein, each of the passageways comprising a respective channel predominantly parallel to the axis of the shaft, each of the channels communicating with at least one respective radial port in the internal stator, each radial port associated with only one of the sets of one or more working compartments, each radial port communicating with the radial inward opening of each working compartment in the respective associated set exactly once during each rotation of the block, at least one of the plurality of passageways comprising an inlet passageway, at least one of the plurality of passageways comprising an exhaust passageway, and at least one of the passageways comprising an ignition passageway.

9. The two-phase internal combustion engine of claim 8 comprising exactly one intake channel, exactly one exhaust channel, and exactly one ignition channel disposed along the axis of the internal stator portion, wherein each of the intake and exhaust passageways comprise a respective annular channel disposed about the ignition channel.

10. The two-phase internal combustion engine of claim 8 wherein at least a first of the radial ports comprises an exhaust port which extends over a first angular interval; and wherein at least a second of the radial ports comprises an intake port associated with the same set of working compartments, the at least a second intake port extending over a second angular interval smaller than the first angular interval.

11. The two-phase internal combustion engine of claim 8 wherein at least one of the sets of one or more working compartments is associated with three radial ports comprising an ignition port, an intake port and an exhaust port; wherein the intake and exhaust ports are adjacent each other and wherein the ignition port is disposed substantially diagonally opposite to the associated pair of intake and exhaust ports.

12. The two-phase internal combustion engine of claim 8 comprising two sets of working compartments, each having a respective radial inlet, radial exhaust and radial ignition port associated therewith, and wherein each of the ports associated with a first of the two sets of one or more working compartments is disposed at a 180 degree phase relation with respect to a corresponding one of the ports associated with the second set of one or more working compartments.

13. The two-phase internal combustion engine of claim 8 comprising exactly two eccentric cam tracks having diametrically opposed eccentricities with respect to the axis of rotation of the device.

14. The two-phase internal combustion engine of claim 8 wherein the ignition passageway comprises a fuel injection means.

15. The two-phase internal combustion engine of claim 8 wherein each set of working compartments comprises the selected number, greater than one, of working compartments arranged as a circular array of working compartments equi-angularly spaced apart about the axis.

16. A pivoting piston rotary device operable as one of a compressor and a pump, the device having an input shaft extending outward from an end of a cylindrical block rotatable about an axis of the shaft and received within an external stator having a tubular wall portion comprising at least two eccentric cam tracks axially spaced apart along an internal surface thereof,
wherein the cylindrical block comprises:
a central cylindrical bore extending through the block along the axis of the shaft;
at least two sets of a predetermined number, equal to or greater than one, of working compartments axially spaced apart so that each of the sets is associated with a respective one of the cam tracks, each of the working compartments disposed at a single radial distance from the axis of the shaft, each compartment forming a sector of a respective hollow cylinder having a respective cylinder axis parallel to the axis of the shaft, each working compartment open to a peripheral surface of the block, each working compartment further having a respective radial inward opening communicating with the central bore;
the device further comprising:
a plurality of piston assemblies, each piston assembly associated with a respective working compartment, each piston assembly comprising at least one cylindrical wall portion, each piston assembly comprising a respective pivot pin having an axis coincident with the respective cylinder axis of the respective working compartment, each piston assembly further comprising a respective roller cam follower for following that eccentric cam track with which it is associated so as to execute angular reciprocating movement when the block rotates; and an internal stator portion received in the cylindrical bore of the block, the internal stator portion having a plurality of passageways formed therein, each of the passageways comprising a respective channel predominantly parallel to the axis of the shaft, each of the channels communicating with at least two respective radial ports in the internal stator, each of the radial ports communicating with each of the radial inward openings in a respective one of the sets of one or more working compartments exactly once during each rotation of the block, at least one of the plurality of passageway comprising an inlet passageway and at least one of the plurality of passageways comprising an exhaust passageway.

17. The pivoting piston rotary power device of claim 16 wherein the passageways comprise one intake passageway and one exhaust passageway, one of the intake and exhaust passageways comprising an axial channel, the other of the intake and the exhaust passageways comprising an annular channel disposed about the axial channel.

18. The pivoting piston rotary power device of claim 16 wherein each of the ports extends over substantially 180 degrees of arc.

19. The two-phase pivoting piston rotary power device of claim 16 wherein the radial ports comprise a first pair of intake and exhaust ports communicating with a first of two sets of one or more working compartments and a second pair of intake and exhaust ports communicating with the second set of one or more working compartments; and wherein the first pair of intake and exhaust ports is disposed at a 180 degree phase relationship with respect to the second pair of intake and exhaust ports.

20. The two-phase pivoting piston rotary power device of claim 16 wherein the at least two eccentric cam tracks comprise exactly two cam tracks having diametrically opposed eccentricities with respect to the axis of rotation of the device.

21. The two-phase pivoting piston rotary power device of claim 16 wherein each set of working compartments comprises the selected number, greater than one, of working compartments arranged as a circular array of working compartments equi-angularly spaced apart about the axis.

22. A pivoting piston rotary device operable as one of a fluid-driven motor and a fluid expander, the device having an output shaft extending outwardly from an end of a cylindrical block rotatable about an axis of the shaft and received within an external stator having a tubular portion comprising at least two eccentric cam tracks axially spaced apart along an internal surface thereof,
wherein the cylindrical block comprises:
a central cylindrical bore extending through the block along the axis of the shaft;
at least two sets of a predetermined number, equal to or greater than one, of working compartments axially spaced apart so that each of the sets is associated with a respective cam track, each of the working compartments disposed at a single radial distance from the axis of the shaft, each compartment forming a sector of a respective hollow cylinder having a respective cylinder axis parallel to the axis of the shaft, each working compartment open to a peripheral surface of the block, each working compartment comprising a radial inward opening communicating with the central bore;
the device further comprising:
a plurality of piston assemblies, each piston assembly comprising a respective piston movable within a respective working compartment, each piston comprising at least one cylindrical wall portion, each piston assembly comprising a respective pivot pin having a respective axis coinciding with the cylinder axis of the respective working compartment, each piston assembly further having a roller cam follower for following that cam track with which it is associated so as to execute angular reciprocating movement when the block rotates; and an internal stator portion received in the cylindrical bore of the cylindrical block, the internal stator portion having a plurality of passageways formed therein, each of the passageways comprising a channel predominantly parallel to the axis of the shaft, each of the channels communicating with at least two respective radial ports in the internal stator, each radial port communicating with the radial inward opening in each working compartment in a respective set thereof exactly once during each rotation of the block, at least one of the plurality of passageway comprising an inlet passageway, at least one of the plurality of passageways comprising an exhaust passageway.

23. The pivoting piston rotary power device of claim 22 wherein the passageways comprise one intake passageway and one exhaust passageway, one of the intake and exhaust passageways comprising an axial channel, the other of the intake and the exhaust passageways comprising an annular channel disposed about the axial channel.

24. The pivoting piston rotary power device of claim 22 wherein each of the ports extends over substantially 180 degrees of arc.

25. The two-phase pivoting piston rotary power device of claim 22 wherein the radial ports comprise a first pair of intake and exhaust ports communicating with a first of two sets of one or more working compartments and a second pair of intake and exhaust ports communicating with the second of the two sets, wherein each of the intake and exhaust ports of the first pair is disposed at a 180 degree phase relationship with respect to the corresponding port in the second pair of intake and exhaust ports.

26. The two-phase pivoting piston rotary power device of claim 22 wherein the at least two eccentric cam tracks comprise exactly two cam tracks having diametrically opposed eccentricities with respect to the axis of rotation of the device.

27. The two-phase pivoting piston rotary power device of claim 22 wherein each set of working compartments comprises the selected number, greater than one, of working compartments arranged as a circular array of working compartments equi-angularly spaced apart about the axis.

28. A pivoting piston rotary power device operable as one of a fluid-driven pump and fluid-driven compressor, the device having an output shaft extending outwardly from an end of a cylindrical block rotatable about an axis of the shaft and received within an external stator having a tubular portion comprising at least two eccentric cam tracks axially spaced out along an internal surface thereof, wherein the cylindrical block comprises:
a central cylindrical bore extending through the block along the axis of the shaft;
at least two sets of working compartments axially spaced apart so that each set is associated with a respective cam track, each set comprising a predetermined number, equal to or greater than one, of working compartments disposed at a single radial distance from the axis of the shaft, each compartment forming a sector of a respective hollow cylinder having a respective cylinder axis parallel to the axis of the shaft, each working compartment open to a peripheral surface of the block, each working compartment comprising a radially inward opening communicating with the central bore;

the device further comprising:
a plurality of piston assemblies, each piston assembly comprising one piston movable within a respective working compartment, each piston comprising at least one cylindrical wall portion, each piston assembly comprising a respective pivot pin having a respective axis coinciding with the cylinder axis of the respective working compartment, each piston assembly further having a roller cam follower for following the cam track associated therewith so as to execute angular reciprocating movement when the block rotates; and
an internal stator portion received in the cylindrical bore of the cylindrical block, the internal stator portion having four passageways formed therein, one pair of passageways comprising a first intake and a first discharge passageway connected to respective intake and exhaust ports for communicating a first fluid at a first pressure to the first set of working compartments, a second pair of passageways comprising a second intake and a second discharge passageway each connected to respective intake and exhaust ports for communicating a second fluid at a second pressure to the second set of working compartments.

29. The pivoting piston rotary power device of claim 28 wherein the first intake and discharge passageways are connected to respective circumferentially adjacent intake and discharge ports axially aligned with the first set of working compartments, and the second intake and discharge passageways are connected to respective circumferentially adjacent intake and discharge ports axially aligned with the second set of working compartments.

30. The pivoting piston rotary power device of claim 28 wherein each of the intake and exhaust ports extends over substantially 180 degrees of arc.

31. The two-phase pivoting piston rotary power device of claim 28 wherein a first pair of intake and exhaust ports communicating with the first set of working compartments is disposed at a 180 degree phase relationship with respect to the second pair of intake and exhaust ports communicating with the second set of working compartments.

32. The two-phase pivoting piston rotary power device of claim 28 wherein the at least two eccentric cam tracks comprises two tracks having diametrically opposed eccentricities with respect to the axis of rotation of the device.

33. The two-phase pivoting piston rotary power device of claim 28 wherein each set of working compartments comprises the selected number, greater than one, of working compartments arranged as a circular array of working compartments equi-angularly spaced apart about the axis.

34. A pivoting piston rotary device operable as a compound two-phase internal combustion engine and a compressor, the device having an input shaft extending outward from an end of a cylindrical block rotatable about an axis of the shaft and received within an external stator having a tubular wall portion comprising at least two eccentric cam tracks, wherein the cylindrical block comprises:
a central cylindrical bore extending through the block along the axis of the shaft;

at least two sets of working compartments axially spaced apart so that each set is associated with a respective one of the cam tracks, each set comprising a predetermined number of working compartments disposed at a single radial distance from the axis of the shaft, each compartment forming a sector of a respective hollow cylinder having a respective cylinder axis parallel to the axis of the shaft, each working compartment open to an outer peripheral surface of the block, each working compartment further having a respective radial inward opening communicating with the central bore;

the device further comprising:

a plurality of piston assemblies, each piston assembly comprising one piston associated with a respective working compartment, each piston comprising at least one cylindrical wall portion, each piston assembly comprising a respective pivot pin having an axis coincident with the respective cylinder axis of the respective working compartment, each piston assembly further comprising a respective roller cam follower for following that eccentric cam track associated with that set so as to execute angular reciprocating movement when the block rotates; and an internal stator portion received in the cylindrical bore of the block, the internal stator portion having five passageways formed therein, two of the five passageways comprising a compressor intake and a compressor discharge passageway, each communicating with the first set of working compartments, the remaining three of the five passageways comprising an engine intake passageway, an engine exhaust passageway and an engine ignition passageway, each communicating with the second set of working compartments.

35. The compound two-phase internal combustion engine of claim 34 wherein the at least two eccentric cam tracks comprise two tracks having diametrically opposed eccentricities with respect to the axis of rotation of the device.

36. The compound two-phase internal combustion engine of claim 34 wherein the ignition passageway comprises a fuel injection means.

37. The compound two-phase internal combustion engine of claim 34 wherein the ignition passageway comprises an igniting means.

38. The pivoting piston rotary power device of claim 34 wherein two of the five passageways comprise respective circumferentially adjacent intake and exhaust ports extending over substantially 180 degrees of arc.

* * * * *